United States Patent [19]

Weber

[11] 4,079,696
[45] Mar. 21, 1978

[54] APPARATUS FOR TREATING SEEDS WITH A LIQUID

[75] Inventor: Joseph A. Weber, Arlington, Tex.

[73] Assignee: Gustafson, Inc., Dallas, Tex.

[21] Appl. No.: 612,871

[22] Filed: Sep. 22, 1975

[51] Int. Cl.$^2$ ............................................. B05C 3/00
[52] U.S. Cl. ...................................... 118/417; 222/57
[58] Field of Search .................. 118/19, 24, 303, 417; 141/9, 105, 256; 47/57.6, DIG. 9; 222/57

[56] References Cited

U.S. PATENT DOCUMENTS

| 715,031 | 12/1902 | Davidson | 222/57 UX |
| 797,290 | 8/1905 | Kennicott et al. | 222/57 |
| 881,135 | 3/1908 | Kirk | 222/57 X |
| 941,821 | 11/1909 | Sorenson | 118/417 X |
| 1,422,938 | 7/1922 | Dorsey | 222/57 X |
| 1,575,433 | 3/1926 | Lichtenthaeler | 222/57 |
| 3,620,415 | 11/1971 | Ruth | 222/57 |

FOREIGN PATENT DOCUMENTS 1,062,828  3/1967  United Kingdom ................. 222/57

Primary Examiner—Dorsey Newton
Attorney, Agent, or Firm—H. Dale Palmatier

[57] ABSTRACT

An improvement in an apparatus for treating seeds or other particles with a liquid. The apparatus includes a receiving chamber for receiving particles and liquid, and means for conveying consecutive batches of particles and liquid to the receiving chamber. Liquid is metered in batches through a liquid metering means which includes a container and a cyclic container transport. The latter is responsive to the conveyance of batches of particles to the receiving chamber and cycles the container between a dip position in a supply of treating liquid and a dumping position in which a batch of liquid is conveyed to the receiving chamber. The transport orients the container in its dip position so as to drain the container when the level of treating liquid recedes below the container. The retention of treating liquid in the container when the apparatus is not in use is thus avoided. The apparatus may include an auger for conveying particles and liquid from the receiving chamber with concurrent intimate mixing, the auger and receiving chamber being readily removable from the apparatus for cleaning.

5 Claims, 8 Drawing Figures

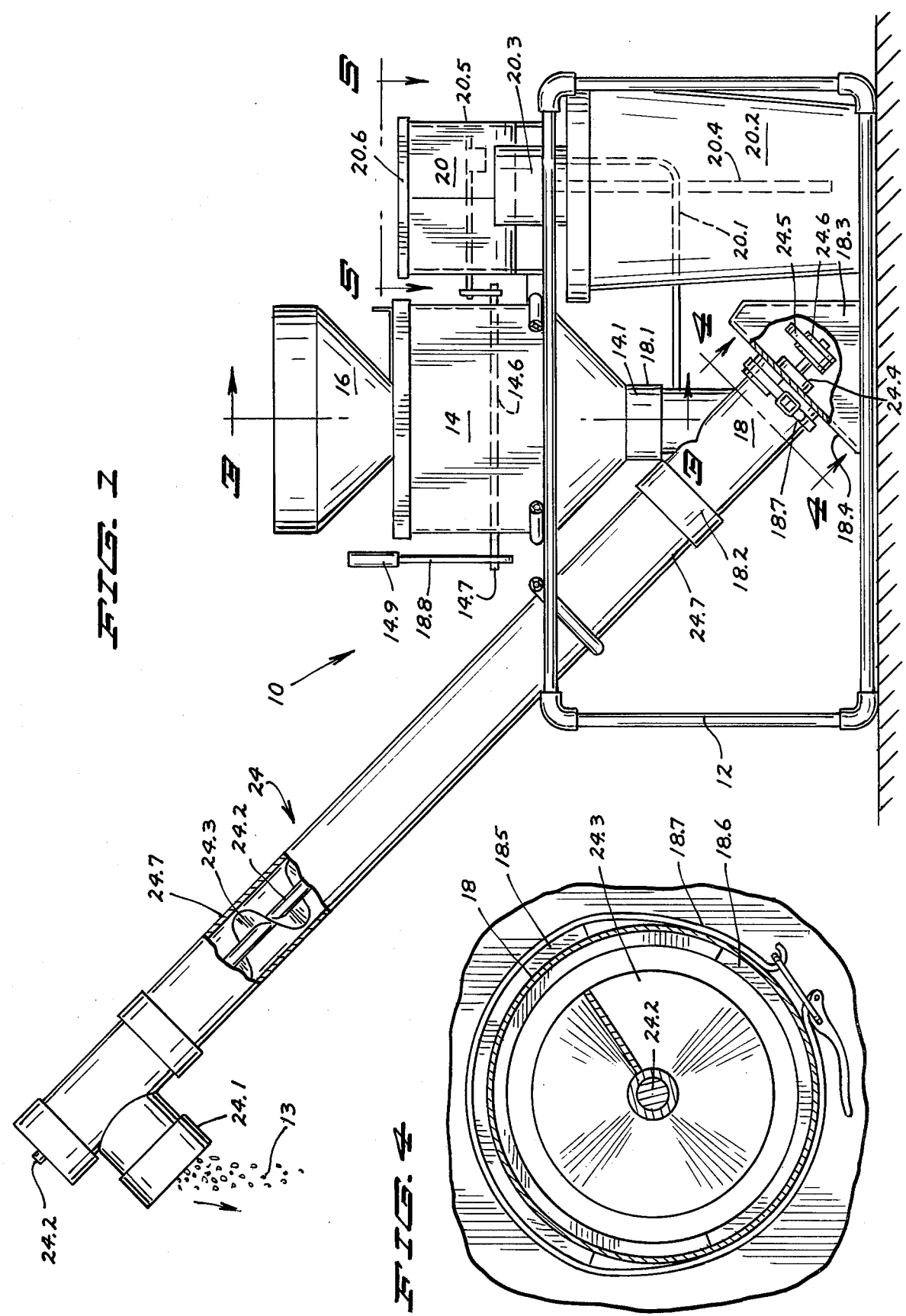

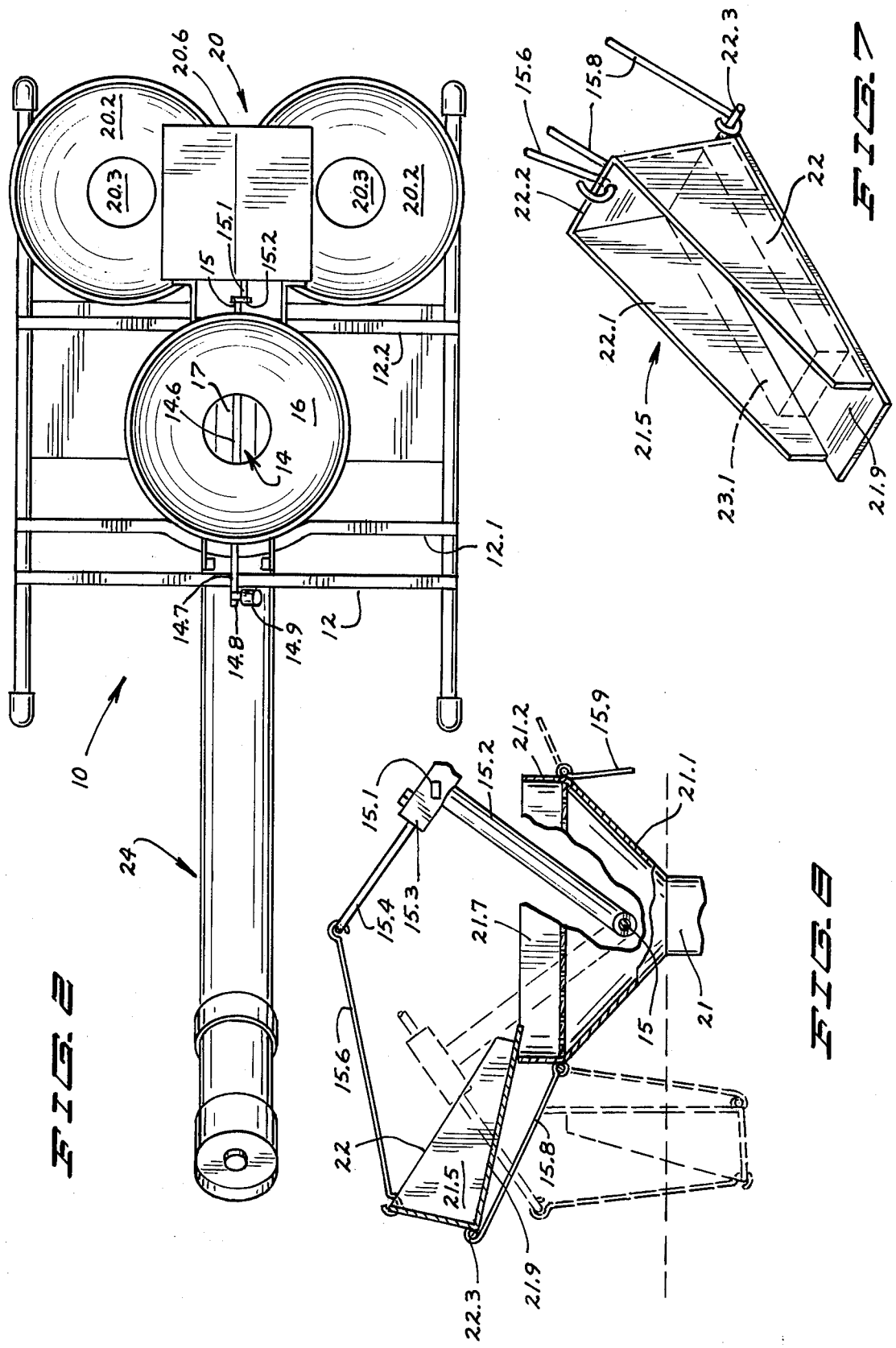

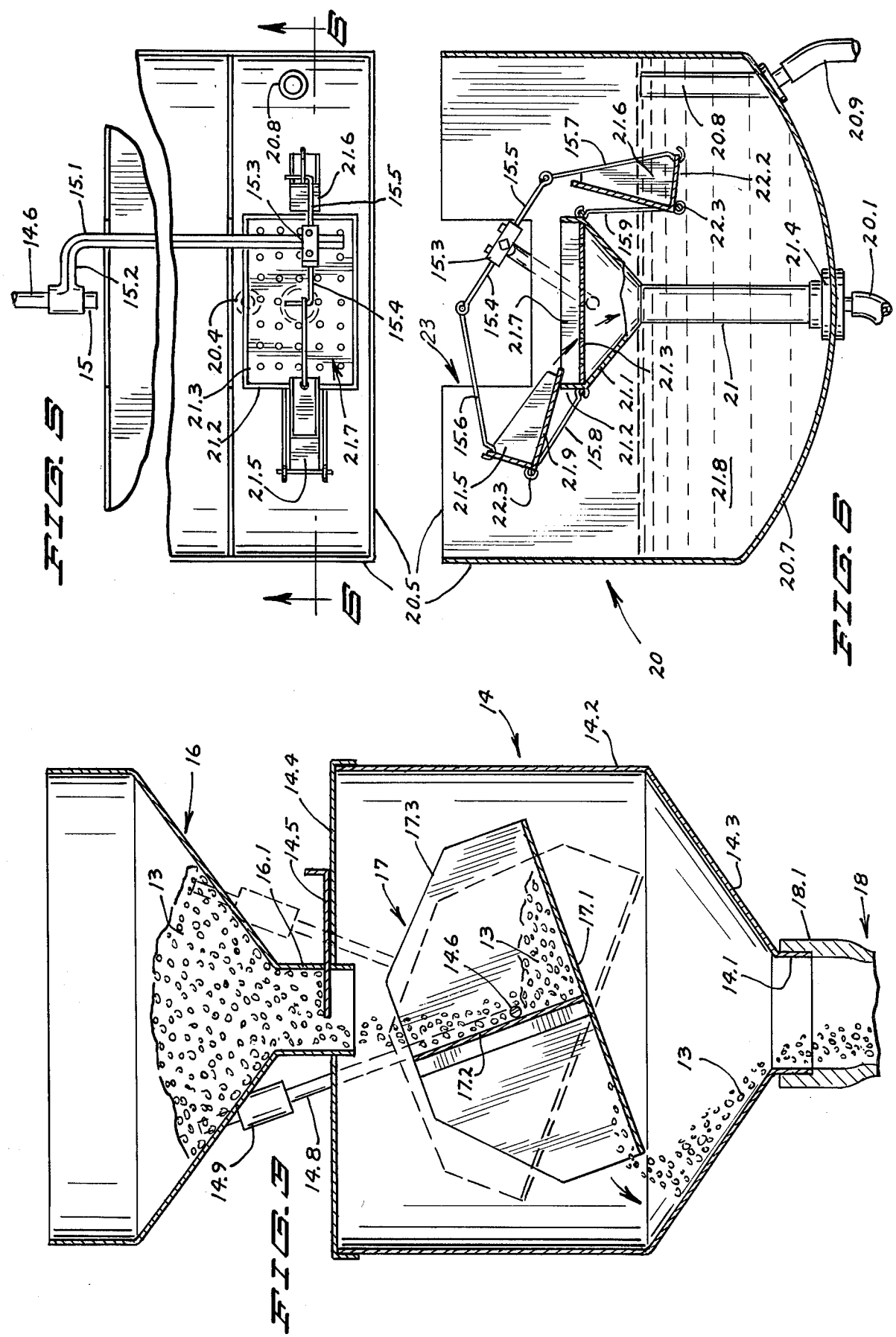

center plate 17.2 arising from the center of the bottom plate 17.1 and making a right angle with the bottom plate. Side walls 17.3 are mounted at either side of the upright plate 17.2 and bottom plate 17.1 as shown in FIG. 3 so that the balance is generally U-shaped in cross section with the side walls 17.3 forming the legs of the U and the bottom plate 17.1 forming the crossbar of the U. The metering balance is rigidly attached to the axle 14.6, the latter passing through the opposed side walls 17.3 and closely adjacent the upright plate 17.2 spaced slightly above the bottom plate 17.1. Rigidly attached to one end 14.7 of the axle which protrudes through a side wall of the metering chamber is a generally upright staff 14.8 having a weight 14.9 movable along its length. The weight is positioned above the level of the axle 14.6 so that the center of gravity of the balance and weighted staff 14.8 is above the axle 14.6. In this manner, the balance plate may cycle (flip-flop) between the position shown in solid lines and in phantom lines in FIG. 3. Suitable stops (not shown) are employed to limit the amount of movement from one side to other of the balance. The center plate 17.2 of the balance divides the balance into two seed-receiving compartments, and the cycling of the balance from one side to the other positions one or the other of these compartments directly underneath the mouth 16.1 of the upper seed hopper 16.

As will now be understood, seeds which are dropped from the hopper mouth 16.1 will fall into one of the balance compartments (the right hand compartment shown in solid lines in FIG. 3) until the weight of seeds in that compartment is sufficiently great to cause the balance and weight staff 14.8 to move to its other position as shown in phantom lines in FIG. 3. The seeds contained in the right hand compartment will thus be discharged from that compartment and released to the conical bottom wall 14.3 of the seed-metering chamber and thence into the receiving chamber 18. Simultaneously, the seeds which continue to fall onto the balance will be received in the left hand most compartment until the seeds in that compartment become too weighty, at which time the process is repeated. The axle 14.6, metering balance 17 and weighted staff 14.8 form a rigid structure, and movement or flip-flop of the balance from one side to the other as it releases consecutive batches of seeds to the receiving chamber causes the axle 14.6 to rock back and forth about its axis. The weight of each batch of seeds which is released (and hence the frequency of consecutive batches) can be adjusted closely by varying the position of the weight 14.9 along the length of the staff 14.8. Although the frequency with which consecutive batches of seeds are released to the receiving chamber does not change the overall through put of seeds, it does have a controlling influence upon the rate at which liquid is added to the receiving chamber, as will now be explained.

The liquid-metering tank 20 is shown best in FIGS. 5 and 6 and includes a generally rectangular walled container 20.5 having a removable cover 20.6 and a tapered, generally rounded bottom 20.7. A supply pipe 20.4 (FIGS. 1 and 5) supplies seed-treating liquid from the storage tanks 20.2 to the liquid-metering tank on a substantially continuous basis. An upright level control tube 20.8 is mounted in the tank and has its open upper end at a level with the desired level of liquid in the tank. The tube 20.8 is equipped with a fitting through the bottom of the tank to drain excess fluid through tube 20.9 back into the liquid tanks 20.2.

A receiver tube 21 rises from the bottom of the tank 20 and has an outwardly flared upper end 21.1 with an upright lip 21.2 arising from its periphery. A horizontal filter screen 21.3 is carried within the lip 21.2, as shown best in FIG. 6. At its lower end, the receiver tube 21 is provided with appropriate fittings 21.4 for passage through the bottom of the tank, and a flexible tube 20.1 is attached to the tube 21 exteriorly of the tank to convey liquid downwardly to the receiving chamber 18.

Containers 21.5, 21.6 are movably mounted at either side of the mouth 21.7 of the receiver tube 21, as shown best in FIG. 6, by means of transport linkages, so that the containers alternately dip into the liquid 21.8 in the tank and convey a predetermined amount of liquid upwardly and dump the liquid into the mouth 21.7. The liquid thence passes through the filter 21.3, through the receiver tube 21 and is conveyed by tube 20.1 to the receiving chamber 18 of the device.

As shown best in FIGS. 6–8, each of the containers 21.5, 21.6 has a base plate 21.9 from which arises side plates 22, 22.1 and end plate 22.2. As shown in FIG. 7, the side and end plates may be formed from a single length of metal sheeting by bending the sheet into a generally U-shaped cross section with the legs of the U forming the side walls 22, 22.1, and then welding or soldering the U-shaped sheet to the periphery of the base plate 21.9. An axle 22.3 is affixed to the container adjacent the juncture of the base and end plates, and the ends of the axle protrude slightly from the side plates.

The axle 14.6, which is rocked back and forth about its axis by the metering balance 17, has an end 15 which protrudes from the side of the seed-metering chamber 14. A crank arm 15.1 is rigidly connected to the end 15 of the axle by a connecting arm 15.2, and extends parallel to the axle so that as the latter rocks back and forth about its axis, the crank arm 15.1 sweeps out an arc above the axis of the axle 14.6. The walls 20.5 of the tank 20 are provided with a large, central notch 23 to afford room for movement of the crank arm 15.1. A connector block 15.3 is mounted to the crank arm 15.1 by means of bolts or the like. From the sides of the connector block extend bars 15.4, 15.5, with transversely bent outward ends. Pivotally mounted to the ends of the bars 15.4, 15.5 are struts 15.6, 15.7 which are pivotally attached at their other ends to the upper edge of the end wall 22.2 of the containers 21.5, 21.6, respectively. Shorter struts 15.8, 15.9 are pivotally mounted at their ends to the mouth 21.7 of the receiving tube 21, and to the outwardly projecting ends of the axle 22.3 mounted to the containers 21.5, 21.6. The various lengths of the struts 15.6, 15.7, 15.8, 15.9 are so chosen that when the crank arm 15.1 is in its right-most position as shown in FIGS. 6 and 8, the left-most container 21.5 is in position to dump its contents into the receiving tube 21; that is, the base plate 21.9 of the container 21.5 slopes downwardly toward its open end which in turn protrudes within the mouth of the receiving tube 21. In this position, the other container 21.6 is oriented so that any fluid therewithin may drain along its downwardly and outwardly slanted end plate 22.2.

As the crank arm 15.1 is thereafter swung to the left toward the position shown in phantom lines in FIG. 8, the strut 15.7 (FIG. 6) is moved upwardly, causing the container 21.6 to initially rotate generally counterclockwise about the axle 22.3 into a liquid-carrying position. Further movement of the crank arm 15.1 to the left causes the container 21.6 to swing upwardly and to dump its contents into the mouth of the receiving tube.

APPARATUS FOR TREATING SEEDS WITH A LIQUID

BACKGROUND OF THE INVENTION

It is often desirable to coat seeds with various liquids including pesticides or fungicides. A machine for treating seeds or other particles with liquids is disclosed in my co-pending U.S. patent application Ser. No. 434,033, filed Jan. 17, 1974 for APPARATUS FOR TREATING AND MIXING PARTICLES, now U.S. Pat. No. 3,912,231, issued Oct. 14, 1975.

Machines which have been designed for the treating of seeds or other particles with liquids generally are quite complex and are used to treat large volumes of seeds at special facilities. Careful regulation of the relative amounts of seeds and liquids is required, and such machines (particularly the liquid-handling parts) should be routinely cleaned and inspected. The seed-treating liquids which are used often are thick and viscous. Treating liquids of this type tend to be retained on the surfaces of the liquid-handling parts of such machines and particularly in the cups which may be employed to convey batches of treating liquid. When the machines are not in use, the liquid retained in the cups evaporates, leaving a solid residue or crust of e.g. a pesticide. When the machine is put into use again, the crust remaining from previous uses reduces the capacity of the cups and thus changes the ratio of seeds to liquid.

A seed-treating device which would be sufficiently inexpensive to be used by individual farmers for treating their seeds would be particularly valuable in the agricultural field. A machine of this type should have the capability of accurately and successfully treating small volumes of seed with a treating liquid. It should also be easily disassembled for cleaning, and particularly the liquid-handling parts of the device should retain little if any liquid when the treating liquid has been drained from the machine.

BRIEF SUMMARY OF THE INVENTION

The present invention provides a machine for treating particles such as seeds with a liquid in which little if any contaminating liquid is retained in the machine when the treating liquid is drained therefrom after use. The machine includes a receiving chamber for receiving particles (hereinafter, seeds) and a treating liquid, and means for releasing consecutive batches of seeds to the receiving chamber. The machine includes liquid metering means which comprises a container, and container transport means responsive to the release of batches of seeds to the receiving chamber and cycling the container between a dip position in a supply of treating liquid and a dumping position in which a batch of liquid from the container is conveyed into the receiving chamber. The transport means orients the container in both its dip position and its dump position so that liquid in the container may drain out.

The machine desirably includes an auger slanting upwardly from the receiving chamber for augering seeds and liquid upwardly to cause intimate contact between the seeds and liquid and to deliver the treated seeds from its upper end. The auger includes a shaft which is driven about its axis, a helical ribbon mounted to the shaft for rotation, and an outer, cylindrical barrel spaced from the edges of the helical ribbon. A quick-release fastener mounts the barrel and receiving chamber in place to permit the barrel to be easily removed for cleaning.

BRIEF DESCRIPTION OF THE DRAWING

FIG. 1 is a side view of the seed-treating device of the invention, partially in cross section;
FIG. 2 is a top view of the device shown in FIG. 1;
FIG. 3 is a broken away, cross-sectional view taken along line 3—3 of FIG. 1;
FIG. 4 is a cross-sectional, broken away view taken along line 4—4 of FIG. 1;
FIG. 5 is a top view of a portion of the invention taken along line 5—5 of FIG. 1 with cover removed;
FIG. 6 is a cross-sectional, broken away view taken along line 6—6 of FIG. 5;
FIG. 7 is an enlarged, broken away, perspective view of a liquid container shown also in FIGS. 5 and 6; and
FIG. 8 is a broken away, cross-sectional view of a portion of the device shown in FIG. 6.

DETAILED DESCRIPTION OF THE PREFERRED EMBODIMENT

Referring first to FIGS. 1 and 2, the device 10 of the invention includes a tubular, generally parallelepiped-shaped framework 12. A generally cylindrical seed-metering chamber 14 is supported above floor level by transverse frame members 12.1, 12.2, and has an upper open end to receive seeds from an upper seed hopper 16. The seed-metering chamber 14 has an inwardly tapered bottom with an open lower end 14.1 for releasing seeds into a receiving chamber 18. A liquid metering tank, shown generally as 20 is also supported by the framework at approximately the same level as the seed-metering chamber, and a liquid conduit 20.1 leads from the liquid-metering tank 20 to the receiving chamber 18 to contact seeds released from the seed-metering chamber 14. Treating liquid is stored in storage tanks 20.2 positioned at either side of and below the liquid-metering tank 20, and electrically powered pumps 20.3 convey liquid upwardly to the liquid-metering tank through pipes 20.4.

Extending upwardly at an oblique angle is an auger designated generally as 24 for conveying seeds and liquid from the receiving chamber 18 with concurrent agitation of the seeds to provide thorough and intimate contact of the seeds with the liquid. The upper end of the auger 24 includes a spout 24.1 from which the treated seeds issue for collection in a suitable container. The auger is driven by an electric motor (not shown) at its lower end beyond its intersection with the receiving chamber 18.

Referring now to FIG. 3, the seed-metering chamber 14 has generally cylindrical upright walls 14.2 and a tapered, cone-shaped bottom 14.3 for guiding seeds (shown as 13) through its open lower end into the upper open end 18.1 of the receiving chamber 18. The metering chamber 14 is provided at its open upper end with a cover 14.4 having a central opening which receives the open lower end 16.1 of an upper seed hopper 16. An adjustable gate 14.5 which rides on the top of the cover 14.4 is movable through a horizontal slot in the mouth 16.1 of the hopper to adjust the flow rate of seeds from the hopper.

An axle 14.6 passes transversely through the seed-metering chamber 14 and extends from the opposing side walls 14.2. Rigidly mounted to the axle 14.6 is a "flip-flop" metering balance shown generally as 17 in FIG. 3, the balance having a bottom plate 17.1 and a Concurrently, the strut 15.6 swings the left-most container 21.5 outwardly and downwardly into the position shown in phantom lines in FIG. 8 in which it also is in a draining position. In this manner, each release of a batch of seeds from the metering balance results in a discharge of liquid from one of the containers into the receiving tube 21. The rate at which liquid is discharged into the receiving tube is a function of the frequency with which the axle 14.6 is rocked back and forth on its axis. It may in some instances be desirable to change the capacity of the containers 21.5, 21.6, and for this purpose a plug 23.1 of plastic or other inert material (shown in phantom lines in FIG. 7) may be inserted into the containers to reduce their liquid-holding capacity.

The auger, shown generally as 24 in FIGS. 1 and 2, comprises an upwardly and outwardly slanted shaft 24.2 carrying a helical thread or ribbon 24.3, the lower end of the shaft passing through a bearing 24.4 at the bottom of the receiving chamber 18, and being driven by an electric motor (not shown) by means of belt and pulley 24.5, 24.6. A barrel 24.7, of circular cross section, spacingly surrounds the helical threads 24.3. The shaft 24.2 is driven in a direction so as to transport seeds from the receiving chamber upwardly within the barrel 24.7. At its upper end, the barrel 24.3 is provided with a T-coupling 24.1 for use as a spout in discharging treated seeds from the device of the invention.

The receiving chamber 18, as shown best in FIG. 1, is a generally Y-shaped structure with one leg of the Y rising generally vertically and terminating in an enlarged section 18.1 within which is received the lower open end 14.1 of the seed-metering chamber 14. The other leg of the Y extends outwardly and upwardly at an oblique angle to the horizontal and terminates upwardly in an enlarged diameter portion 18.2 within which is received the lower end of the barrel 24.7. The latter-mentioned leg of the Y-shaped receiving chamber extends downwardly and abuts the slanted upper plate 18.4 of a housing 18.3, within which is also received the lower end of the rotating shaft 24.2. The generally upright leg of the receiving chamber merges into and is joined to the slanted leg approximately midway along the length of the slanted leg, all as shown in FIG. 1.

The slanted upper plate 18.4 of the housing 18.3 is provided with a pair of outwardly extending curved flanges 18.5, 18.6 (FIGS. 1 and 4). The flanges are so curved as to respectively lie flushly against the outer and inner peripheral surfaces of the lower, slanted end of the receiving chamber 18, as shown best in FIG. 4. A spring loaded clamp 18.7 passes around the flanges and lower end of the receiving compartment to rigidly hold the lower receiving compartment end flushly against the slanted plate 18.4 of the gear box.

At its upper end, the barrel 24.7 is provided with a bearing (not shown) through which the shaft 24.2 protrudes to center the shaft and its helical threads within the barrel.

The seed-metering chamber 14, hopper 16 and liquid-metering tank 20 preferably are all made of stainless steel sheeting to avoid any corrosive effect of various treating liquids. The receiving chamber 18, and the barrel 24.7 enclosing the helically threaded shaft 24.2, however, are desirably of plastic such as polyvinyl chloride. The barrel 24.7 may have an inner diameter of four inches, whereas the outer diameter of the threads 24.3 may be on the order of three inches. The barrel and receiving chamber may be economically fabricated from commercially available plastic pipe and "Y" pipe connectors, of the type employed in conventional residential and commercial plumbing systems.

As described, the device of the invention is extremely easy to disassemble and clean. By disengaging the spring loaded clamp 18.7 from the bottom of the receiving chamber 18, and by lifting the seed-metering chamber 14 upwardly slightly, the barrel 24.7 and the receiving chamber 18 may be removed as a unit from the device for cleaning. This also permits the exposed flights of threads 24.3 to be cleaned. Similarly, the hopper 16 and the cover 14.4 of the seed-metering chamber may be removed for cleaning. By removing the cover 20.6 of the liquid-metering tank, the liquid-metering device is fully exposed for cleaning.

In operation, the seeds to be treated are placed in the hopper 16 and are permitted to fall at a regulated rate through the open bottom or mouth 16.1 of the hopper into one or the other of the compartments of the metering balance 17. As the metering balance compartments are alternately filled and emptied, the axle 14.6 is caused to rock back and forth which in turn causes the crank arm 15.1 in the liquid metering tank to similarly move back and forth through an arc. The containers 21.5, 21.6 are thus alternately dipped into the liquid 21.8 in the tank and are emptied into the large mouth of the receiving tube 21. The seeds from the metering chamber 14 merge with the liquid from the metering tank 20 in the receiving chamber 18. Operation of the auger causes the seeds and liquid to be augered upwardly through the barrel 24.7, and the augering action causes the seeds, which fill the barrel, to rub against each other and thus to spread treating liquid over substantially the entire surface of the seeds. The thus treated seeds exit from the spout 24.1 at the top of the auger.

The rate at which seeds are treated in the device of the invention depends upon the rate at which seeds are permitted to pass by the gate 14.5 at the bottom of the seed hopper 16, as shown in FIG. 3. The quantity of treating liquid which enters the receiving chamber 18 depends upon the frequency with which the metering balance 17 flip-flops back and forth, and upon the capacity of the containers 21.5, 21.6 in the liquid metering tank. The frequency with which the metering balance 17 flip-flops in turn depends upon the position of the weight 14.9 along the staff 14.8. The capacity of the containers 21.5, 21.6 may be changed by the use of inserts (23.1 in FIG. 7). The relative amounts of seeds and treating liquid thus can be varied widely.

After use, the liquid metering tank 20 is appropriately drained to the storage tanks 20.2. As the liquid level in the tank 20 falls below the level of the containers 21.5, 21.6, the containers drain into the tank, and very little liquid is thus retained. The struts 15.6–15.9 may be made of stiff, stainless steel wire having looped ends so that the wires, and the containers, can be easily removed for separate cleaning. The filter screen 21.3 desirably is removable upwardly from the receiving tube 21 for cleaning.

Thus, I have provided relatively low cost device for treating seeds with liquid so that seeds may be treated economically by individual farmers at their farms. The device is easily and inexpensively manufactured and assembled, and can be easily disassembled for cleaning following a seed-treating operation. The liquid-metering device is self-draining to greatly reduce the retention of treating liquid in the device, and the ratio of seeds to liquid can be varied widely to accommodate different sizes and types of seeds and different types of treating liquid. With the device of the invention, for example, each of the containers may have a capacity of approximately ten cubic centimeters and the device may be capable of handling from eightly to ninety bushels per hour of small grains such as wheat, or up to seventy bushels per hour of larger grains such as corn. In normal operation, the frequency of flip-flops of the metering balance may be on the order of one per second. Despite the space between the threads of the threaded shaft and the surrounding tube, the device operates to yield substantially completely coated seeds. The through put of the device can, of course, be reduced greatly from the figures set out above simply by adjusting the slide plate restricting the flow rate of seeds from the hopper into the metering balance compartment; in this event, it is desirable to adjust the device so that the metering balance flip-flops (and the liquid containers discharge into the receiving chamber) at a relatively high frequency. The amount of liquid conveyed during each cycle may be reduced through the use of the inserts, as explained above.

While I have described a preferred embodiment of the present invention, it should be understood that various changes, adaptations, and modifications may be made therein without departing from the spirit of the invention and the scope of the appended claims.

What I claim is:

1. A seed treater for treating seeds with a liquid and comprising
    a receiving chamber for receiving seeds and liquid;
    seed-metering means comprising a two-compartment seed balance and an axle supporting the balance and passing between the compartments and arranged to rock about its axis and permit the balance to tip from one side to the other to alternately release seeds from the respective compartments to the receiving chamber;
    a liquid receiving tube for conveying liquid to the receiving chamber and having a wide, upwardly open mouth;
    a pair of containers on either side of the mouth of the receiving tube, and container transport means comprising a crank arm joined to but offset from the axle of the seed balance, and pivotal links connecting the crank arm and the containers with at least two links pivotally mounted in spaced relationship to each container for cycling the containers alternately between a dip position in which a container is dipped into a supply of liquid and dump position in which the container dumps liquid into the open mouth of the receiving tube, the containers cycling through dip and dump positions in response to movement of the crank arm, the pivotal links orienting the containers in their dip positions so as to permit gravity drainage of the containers; and
    an auger extending upwardly and outwardly from the receiving chamber to transport seeds and liquid with concurrent mixing.

2. An apparatus to be alternately stored and used in successive periods, the apparatus being for use in measuring and delivering a succession of predetermined quantities of liquid, as in treatment of seeds, comprising
    a supply tank to receive when being prepared for use and to contain during such periodic use a supply of the liquid and from which the liquid may be drained at the conclusion of such use in preparation for storing the apparatus so that the tank will be empty during the period when the apparatus is being stored;
    an upright liquid receiver into which measured quantities of the liquid are delivered and having a wide upwardly open mouth defined by a wall with an upper edge over which such quantities are delivered;
    a liquid measuring and delivery container to be filled with such quantities of liquid from the liquid supply which is contained in the tank during use of the apparatus so that such quantities may be delivered to the receiver, the container having a front end with a pouring lip over which the liquid may flow when the container is tipped forwardly, and also having a rear end with a rear wall over the top edge of which the liquid may drain when the container is tipped rearwardly, and
    two position transport means mounting and carrying said container to and between a first position and a second position, the two positions of the transport means corresponding to the first and second positions of the container, the container being located in said first position within the tank and in rearwardly tipped orientation wherein said top edge of the rear wall of the container is positioned below all other portions of the container so that all of the liquid will drain from the container as the tank is emptied upon completion of such periodic use and in preparation for storage, the container in first said position being at least partially immersed in the supply of liquid when liquid is contained in the tank during such periodic use, the container being located in said second position adjacent the wall of the receiver and in forwardly tipped orientation wherein said front pouring lip is positioned below all other portions of the container for pouring the liquid from the container and over the front end pouring lip and into the receiver, said transport means orienting the container in such rearwardly and forwardly tipped orientations at the respective first and second positions, the transport means tipping the container to upright orientation in the tank as the container moves between said first and second positions, the container in said upright orientation being capable of holding such a measured quantity of treating liquid whereby when the tank contains liquid, the container will be filled with liquid as the container moves from first position to second position.

3. Apparatus to be alternately stored and used in successive periods, the apparatus being for periodic use in measuring and delivering a succession of predetermined quantities of liquid in coordination with movement of particulate material such as seeds, comprising
    a supply tank to receive when being prepared for use and to contain during such periodic use a supply of the liquid and from which the liquid may be drained at the conclusion of such use and preparation for storing the apparatus so that the tank will be empty during the period when the apparatus is being stored;
    an upright liquid receiver into which measured quantities of the liquid are delivered and having a wide upwardly open mouth defined by a wall with an upper edge over which such quantities are delivered;
    a pair of liquid measuring and delivery containers at opposite sides of the mouth of the receiver to be alternately filled with such quantities of liquid from the supply which is contained in the tank during use of the apparatus so that such quantities may be delivered to the receiver, each of the containers having a front end with a pouring lip over which the liquid may flow when the container is tipped forwardly and also having a rear end with a rear wall over the top edge of which the liquid may drain when the container is tipped rearwardly;

two position transport means mounting and carrying said container to and between a first position and a second position, the two positions of the transport means corresponding to the first and second positions of the containers, the containers being in opposite positions wherein the first container is in first position while the second container is in second position and the first container being in second position while the second container is in first position, each of the containers in said first position being located within the tank and in rearwardly tipped orientation wherein said top edge of the rear wall of the container is positioned below all other portions of the container so that all of the liquid will drain from the container as the tank is emptied upon completion of such periodic use and in preparation for storage, the containers in said first positions being at least partially immersed in the supply of liquid when liquid is contained in the tank during such periodic use, each of the containers in said second position being located adjacent the wall of the receiver and in forwardly tipped orientation wherein said front pouring lip is positioned below all other portions of the container for pouring the liquid from the container and over the front end pouring lip and into the receiver, said transport means orienting the containers in such rearwardly and forwardly tipped orientations at the respective first and second positions, the transport means tipping the containers to upright orientations in the tank as the containers move between said first and second positions, the containers in said upright orientations being capable of holding such measured quantities of treating liquid whereby when the tank contains liquid, the containers will be filled with liquid as the containers move from said first positions to the second positions, and seed conveying means including a receiving chamber for seeds and also connected to said liquid receiver in liquid flow communicating relation to apply liquid to the seeds in the chamber, the seed conveying means also including a cyclically operating seed metering means responding to the flow of seed moving toward said receiving chamber and having a drive output providing driving impetus for operating the two position transport means, and driving means interconnecting said drive output with said transport means and coordinating movement of the transport means with the seed metering means.

4. The device of claim 3 wherein the seed-metering means includes a two-compartment seed balance and an axle supporting the balance and arranged to rock about its axis and permit the balance to tip from one side to the other for alternating release of seeds from the compartment, and wherein the container transport means comprises a crank arm offset from the axle, and pivotal links connecting the crank arm and the containers for cycling the latter alternately between first and second positions in response to movement of the crank arm, whereby the rate of liquid metered to the receiving chamber is proportional to the frequency with which the seed balance releases batches of seeds to the receiving chamber.

5. The invention according to claim 3 and an auger conveyor connected with the receiving chamber and conveying and mixing the seed and treating liquid.

* * * * *